(12) United States Patent
Matthies et al.

(10) Patent No.: US 10,144,475 B2
(45) Date of Patent: Dec. 4, 2018

(54) CONTROL SYSTEM FOR TILTING MOTORCYCLE TRIKE

(71) Applicant: Mystery Designs, LLC, Dallas, TX (US)

(72) Inventors: Lawayne Matthies, Dallas, TX (US); Mark D. Siegel, Fort Worth, TX (US); John D. Nickles, Richardson, TX (US)

(73) Assignee: Mystery Designs, LLC, Dallas, TX (US)

( * ) Notice: Subject to any disclaimer, the term of this patent is extended or adjusted under 35 U.S.C. 154(b) by 0 days.

(21) Appl. No.: 15/346,341

(22) Filed: Nov. 8, 2016

(65) Prior Publication Data

US 2017/0050693 A1 Feb. 23, 2017

Related U.S. Application Data

(60) Division of application No. 13/540,224, filed on Jul. 2, 2012, now Pat. No. 9,487,234, which is a
(Continued)

(51) Int. Cl.
*B62K 5/10* (2013.01)
*B62K 5/027* (2013.01)
(Continued)

(52) U.S. Cl.
CPC .................. *B62K 5/10* (2013.01); *B60G 3/20* (2013.01); *B60G 21/007* (2013.01); *B62D 9/02* (2013.01); *B62K 5/027* (2013.01); *B60G 2200/144* (2013.01); *B60G 2200/46* (2013.01); *B60G 2204/82* (2013.01); *B60G 2300/122* (2013.01); *B60G 2300/45* (2013.01); *B60G 2800/012* (2013.01); *B62D 61/08* (2013.01); *B62K 2005/001* (2013.01)

(58) Field of Classification Search
CPC . B62D 9/02; B62D 61/08; B62K 5/10; B62K 5/027; B62K 2005/001; B60G 21/05; B60G 21/007; B60G 21/026; B60G 2300/45; B60G 2800/012; B60G 2204/82; B60G 2206/1112; B60G 2206/1114; B60G 2206/1116
USPC .. 280/124.103, 5.509, 6.154, 6.155, 5.5, 62; 701/37; 180/210
See application file for complete search history.

(56) References Cited

U.S. PATENT DOCUMENTS 3,792,748 A 2/1974 Regier
4,003,443 A 1/1977 Boughers
(Continued)

FOREIGN PATENT DOCUMENTS

JP 02182528 A 7/1990

OTHER PUBLICATIONS

Popular Science, Sep. 2004, p. 117, 1998 Chrysler CCV.
(Continued)

*Primary Examiner* — Keith J Frisby
(74) *Attorney, Agent, or Firm* — James E. Walton

(57) ABSTRACT

A system used to control the orientation of a vehicle's suspension. The system includes a control system receiving input data from a plurality of sensors concerning the relative motion, speed, and orientation of the vehicle. The control system is configured to process the input data and actively control the orientation of the suspension system by selecting a suitable driver speed and tilt angle according to external conditions.

5 Claims, 19 Drawing Sheets

Related U.S. Application Data continuation-in-part of application No. 12/844,552, filed on Jul. 27, 2010, now abandoned, which is a division of application No. 12/033,999, filed on Feb. 20, 2008, now Pat. No. 7,762,368, which is a continuation of application No. 11/007,851, filed on Dec. 9, 2004, now Pat. No. 7,343,997.

(60) Provisional application No. 60/528,041, filed on Dec. 9, 2003, provisional application No. 60/539,457, filed on Jan. 27, 2004, provisional application No. 60/558,006, filed on Mar. 31, 2004.

(51) Int. Cl.

| | |
|---|---|
| *B60G 21/00* | (2006.01) |
| *B62D 9/02* | (2006.01) |
| *B60G 3/20* | (2006.01) |
| B62D 61/08 | (2006.01) |
| B62K 5/00 | (2013.01) |

(56) References Cited

U.S. PATENT DOCUMENTS

| | | | |
|---|---|---|---|
| 4,351,410 | A | 9/1982 | Townsend |
| 4,546,997 | A | 10/1985 | Smyers |
| 4,856,372 | A | 8/1989 | Williamson |
| 4,887,829 | A | 12/1989 | Prince |
| 4,959,043 | A | 9/1990 | Klotz et al. |
| 4,974,863 | A | 12/1990 | Patin |
| 5,040,812 | A | 8/1991 | Patin |
| 5,511,069 | A | 4/1996 | England et al. |
| 5,545,102 | A | 8/1996 | Burgman et al. |
| 5,611,555 | A | 3/1997 | Vidal |
| 5,765,846 | A | 6/1998 | Braun |
| 5,941,790 | A | 8/1999 | Steen et al. |
| 6,328,125 | B1 | 12/2001 | Van Der Brink et al. |
| 2005/0040619 | A1 | 2/2005 | Melcher |
| 2007/0075517 | A1 | 4/2007 | Suhre et al. |
| 2007/0262656 | A1 | 11/2007 | Fulks |

OTHER PUBLICATIONS

Automotive Engineering, Nov. 1997, p. 61, Tech Briefs.
Motorcycle Product News, Nov. 1997, p. 44, Three's Company.
Dealernews, Oct. 1997, p. 14, News from Europe.
Popular Science, Nov. 1989, p. 63, Automotive Newsfront.
Bike Europe, Unknown issue, p. 17, Nothing New About Motorcycles & Scooters with Roofs.
Unknown publication, Unknown issue, Lehman Trikes, Inc., No Lean Suspension (advertisement).
Too Kool Cycles (advertisement), Unknown Issue, www.tookoolcycles.com; Publication Date Unknown.
Notice of Allowance and Examiner's Amendment filed Mar. 19, 2010 in U.S. Appl. No. 12/033,999.
Amendment filed Feb. 10, 2010 in U.S. Appl. No. 12/033,999.
Office Action dated Oct. 14, 2009 in U.S. Appl. No. 12/033,999.
Amendment filed Jul. 8, 2009 in U.S. Appl. No. 12/033,999.
Office Action dated Apr. 29, 2009 in U.S. Appl. No. 12/033,999.
Office Action dated Feb. 3, 2009 in U.S. Appl. No. 12/033,999.
Amendment filed Nov. 17, 2008 in U.S. Appl. No. 12/033,999.
Office Action dated Oct. 22, 2008 in U.S. Appl. No. 12/033,999.
Preliminary Amendment filed Feb. 20, 2008 in U.S. Appl. No. 12/033,999.
Amendment After Notice of Allowance filed Dec. 12, 2007 in U.S. Appl. No. 11/007,851.
Notice of Allowance dated Oct. 5, 2007 in U.S. Appl. No. 11/007,851.
Response to Notice of Non-Compliant Amendment filed Sep. 18, 2007 in U.S. Appl. No. 11/007,851.
Notice of Non-Compliant Amendment dated Aug. 31, 2007 in U.S. Appl. No. 11/007,851.
Amendment A filed Aug. 21, 2007 in U.S. Appl. No. 11/007,851.
Office Action dated May 21, 2007 in U.S. Appl. No. 11/007,851.
Notice of Allowance and Examiner's Amendment dated Jul. 7, 2016 in U.S. Appl. No. 13/540,224.
Supplemental Amendment filed Jun. 15, 2016 in U.S. Appl. No. 13/540,224.
Notice of Non-Compliant Amendment dated May 16, 2016 in U.S. Appl. No. 13/540,224.
Advisory Action Before the Filing of an Appeal Brief dated Apr. 18, 2016 in U.S. Appl. No. 13/540,224.
Amendment After Final filed Apr. 8, 2016 in U.S. Appl. No. 13/540,224.
Office Action dated Feb. 8, 2016 in U.S. Appl. No. 13/540,224.
Amendment filed Dec. 30, 2015 in U.S. Appl. No. 13/540,224.
Office Action dated Aug. 31, 2015 in U.S. Appl. No. 13/540,224.
Response to Restriction Requirement filed Jul. 16, 2016 in U.S. Appl. No. 13/540,224.
Office Action dated May 26, 2015 in U.S. Appl. No. 13/540,224.
Response to Restriction Requirement dated Feb. 17, 2009 in U.S. Appl. No. 12/033,999.

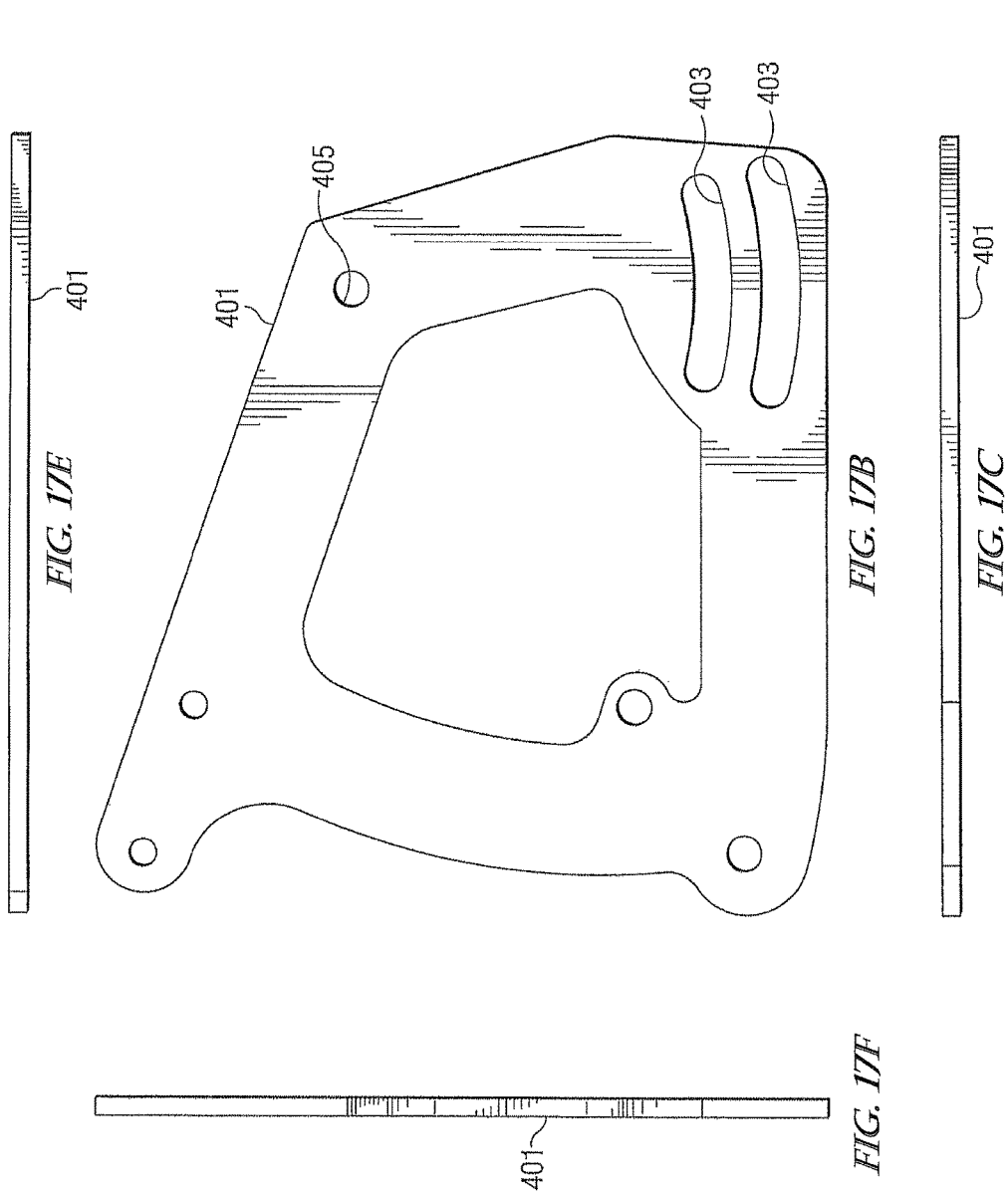

CONTROL SYSTEM FOR TILTING MOTORCYCLE TRIKE

CROSS REFERENCE TO RELATED APPLICATIONS

This application is a divisional of U.S. application Ser. No. 13/540,224, filed on 2 Jul. 2012, titled "Control System for Motorcycle Trike," which was a continuation-in-part of U.S. application Ser. No. 12/844,552, filed on 27 Jul. 2010, titled "Differential for Motorcycle Trike," which was a divisional of U.S. application Ser. No. 12/033,999, filed on 20 Feb. 2008, titled "Tilting Independent Suspension System for Motorcycle Trike," which was a continuation of U.S. application Ser. No. 11/007,851, filed on 9 Dec. 2004, titled "Tilting Independent Suspension System for Motorcycle Trike," which claimed the benefit of U.S. Provisional Application No. 60/528,041, filed 9 Dec. 2003, titled "Tilting Independent Suspension System for Motorcycle Trike," and which claimed the benefit of U.S. Provisional Application No. 60/539,457, filed 27 Jan. 2004, titled "Tilting Independent Suspension System for Motorcycle Trike," and which claimed the benefit of U.S. Provisional Application No. 60/558,006, filed 31 Mar. 2004, titled "Tilting Independent Suspension System for Motorcycle Trike," all of which are hereby incorporated by reference for all purposes as if fully set forth herein.

BACKGROUND OF THE INVENTION

1. Field of the Invention

The present application relates to motorcycle trikes. In particular, the present application relates to a control system for the suspension system of a motorcycle trike.

2. Description of Related Art

In particular, the present application relates Motorcycles are turned by both turning the handlebars and leaning into the turn. At high speeds, motorcycles can be turned simply by leaning into the turn. The ability to lean into the turn makes the motorcycle easier to handle in the turns.

However, when motorcycles are converted into three-wheeled trikes, this ability to lean into the turn is lost. This makes it difficult to handle the trike when turning, particularly at high speeds.

BRIEF DESCRIPTION OF THE DRAWINGS

The novel features believed to be characteristic of the application are set forth in the appended claims. However, the application itself, as well as a preferred mode of use and further objectives and advantages thereof, will best be understood by reference to the following detailed description when read in conjunction with the accompanying drawings, wherein:

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
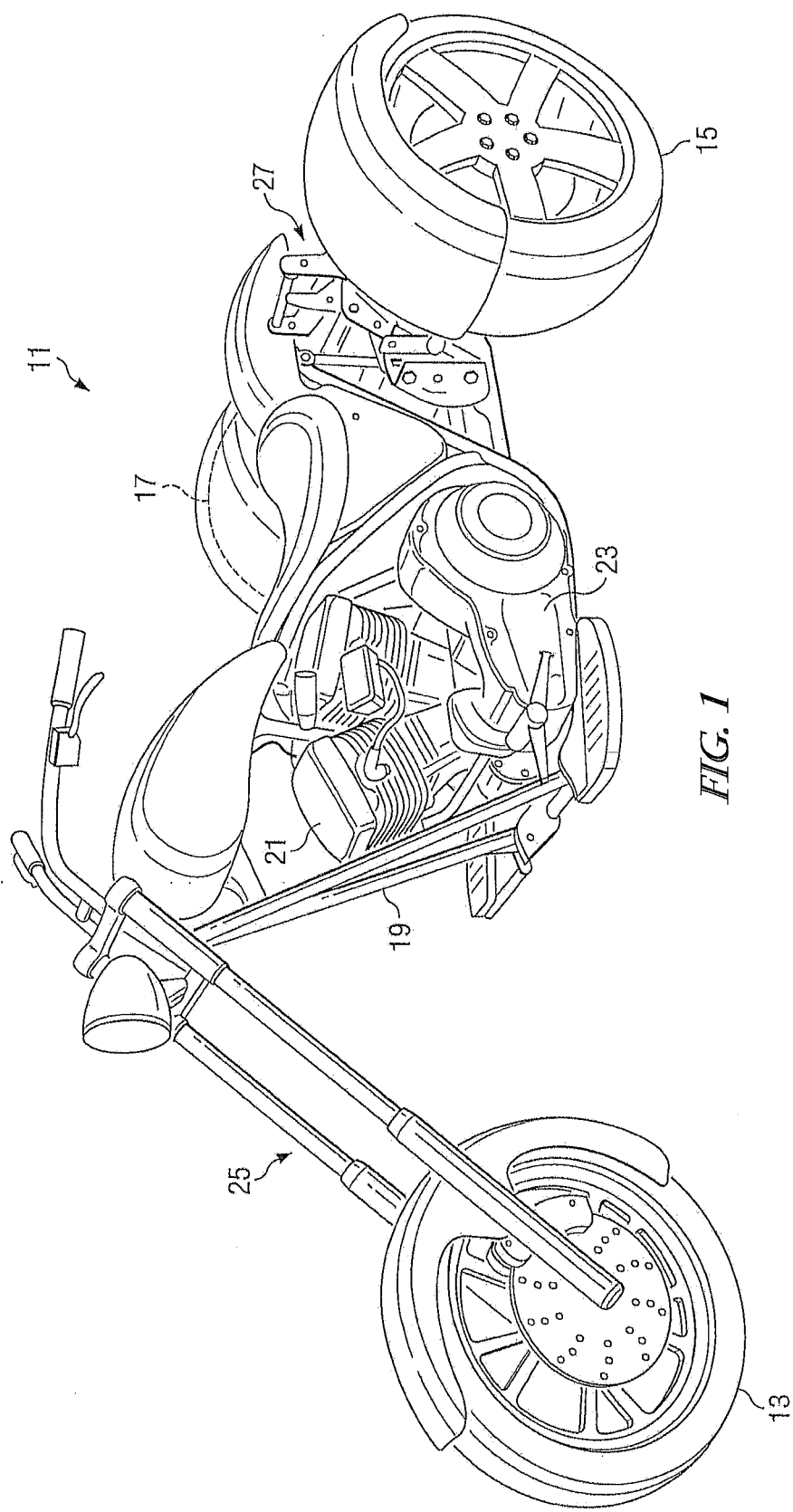
FIG. 1 is a perspective view of a motorcycle trike having a tilting independent suspension system according to the present application.

Referring to FIG. 1 in the drawings, a motorcycle trike, or trike 11, having a tilting independent suspension system according to the present application is illustrated. Trike 11 is three-wheeled motorcycle having a single front wheel 13, and two rear wheels 15 and 17. A frame 19 carries an engine 21 and a transmission 23. Front wheel 13 is coupled to frame 19 via a front fork and suspension system 25. Rear wheels 15 and 17 are coupled to frame 19 via a tilting independent suspension system 27. Suspension system 27 is operable via a control system 57 (see FIGS. 2-4).

Figure 2:
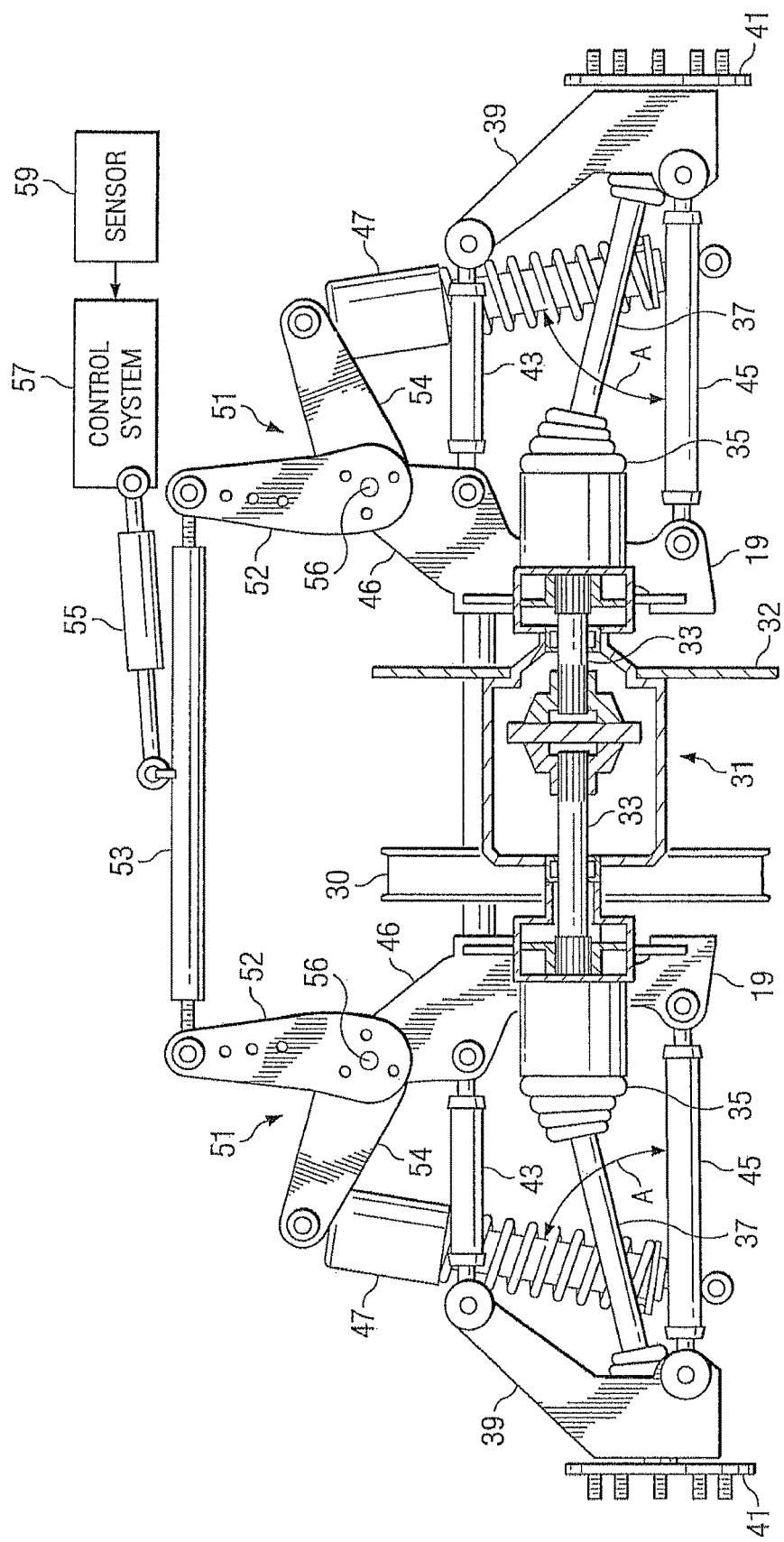
FIG. 2 is a schematic of the suspension system according to the present application, the suspension system being shown in a non-tilting mode.
Figure 3:
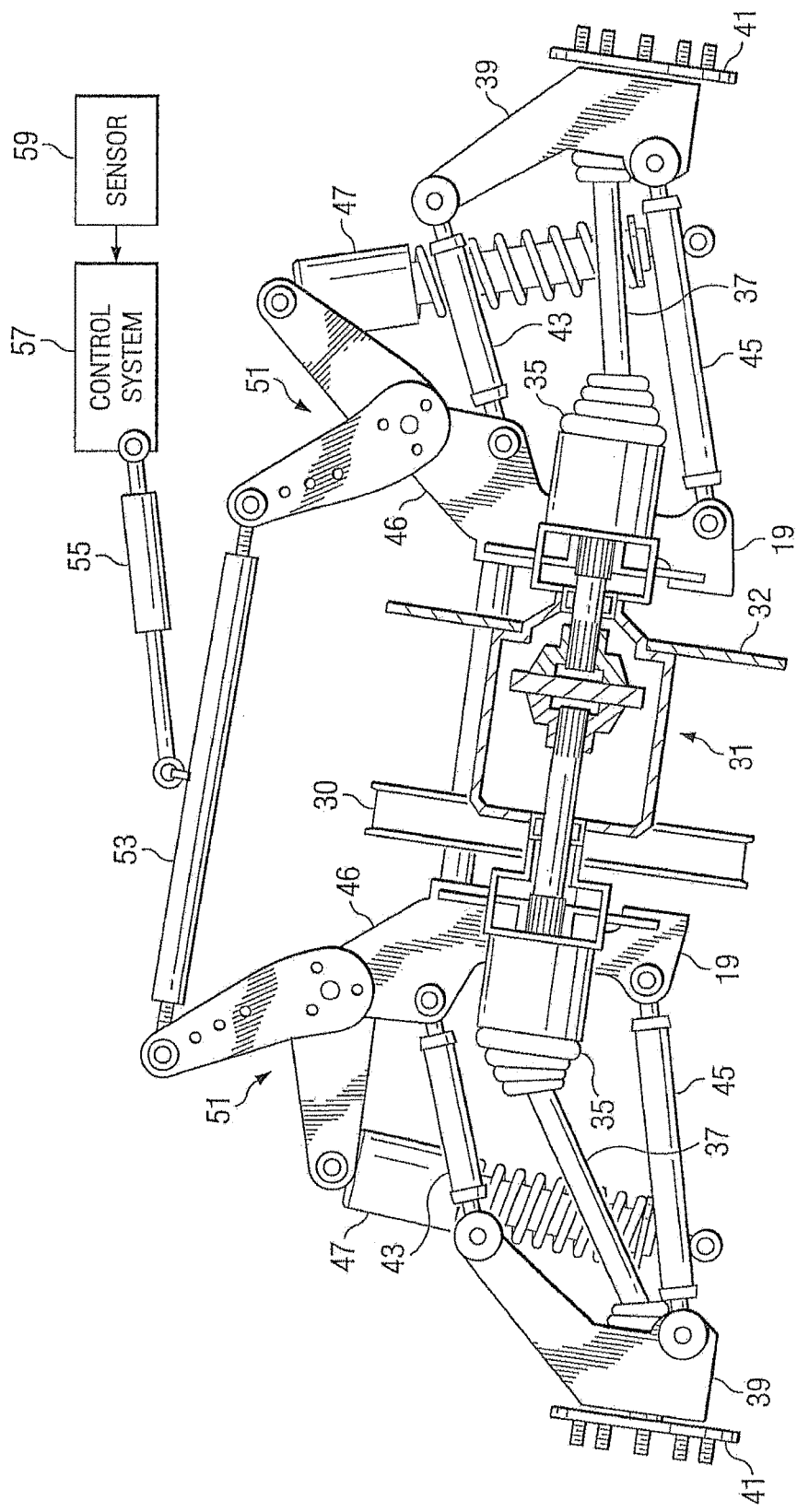
FIG. 3 is a schematic of the suspension system of FIG. 2 shown in a tilting mode.

Referring now to FIGS. 2-5 in the drawings, tilting independent suspension system 27 is illustrated. Suspension system 27 is preferably a double control-arm suspension and is operable between a non-tilting mode, as is shown in FIG. 2, and a tilting mode, as is shown in FIG. 3. Trike 11 operates in the non-tilting mode when traveling in a straight direction, but transitions into the tilting mode when turning. This provides for better, safer, and more enjoyable handling of trike 11. Although suspension system 27 is described as being preferably a double control-arm suspension, it is understood that suspension system 27 is not so limited to such a configuration and may use other types of configurations that permit trike 11 to operably tilt in any direction.

Transmission 23 includes a belt drive or drive shaft unit 30 which mechanically communicates with a differential 31, and at least one disk brake 32. Suspension system 27 includes at least axles 33, universal joints 35, half shaft drive links 37, wheel uprights 39, and wheel hubs 41 along with other associated components configured to permit relative motion of wheels 15 and 17 relative to frame 19. Wheels 15 and 17 are fastened to wheel hubs 41. Uprights 39 are connected to frame 19 via upper and lower controls arms, shown in the figures as upper H-arms 43 and lower H-arms 45, which cooperate to allow each upright 39 to move in a generally vertical path relative to frame 19 as H-arms 43, 45 pivot relative to frame 19. Frame 19 includes towers 46 that extend generally upward from each side of frame 19. The movement of each upright 39 is constrained and damped by a shock absorber 47, which may be an air shock absorber or any other appropriate type of suspension damper.

The unique tilting feature of the subject application is facilitated by two opposing rotating rocker arms 51. In the preferred embodiment, each rotating rocker arm 51 is V-shaped, having an interior leg 52 and an exterior leg 54, such that interior legs 52 and exterior legs 54 meet at vertices 56 and rotate relative to frame 19 about pivot pins 58. It will be appreciated that rotating rocker arms 51 may be of different shapes, sizes, and configurations. Rotating rocker arms 51 are pivotally connected to towers 46 at vertices 56. The upper ends of shock absorbers 47 are pivotally coupled to exterior legs 54, and the lower ends of shock absorbers 47 are pivotally coupled to lower H-arms 45. Shock absorbers 47 and lower H-arms 45 form tilt angles A. The two rotating rocker arms 51 are rigidly and pivotally linked together by an adjustable connecting rod 53 that extends between interior legs 52 of rocker arms 51.

Trike 11 further includes a control system 57 configured to operate suspension system 27 between the tilting mode and the non-tilting mode, Control system 57 is operably coupled to suspension system 27 through connecting rod 53 and a driver 55. Connecting rod 53 is selectively driven in opposing directions by driver 55 as seen in FIGS. 2 and 3. Driver 55 may be a pneumatic, hydraulic 55b, electric 55a, or magnetic device. For example, driver 55 may be a ball-screw device, an actuator, a servo, or other similar electro-mechanical device. Driver 55 is operated by control system 57 in response to input data received from sensors 59. Sensors 59 preferably sense the orientation, speed, and/or motion of trike 11, and may be pneumatic, hydraulic, electric, or magnetic devices, or any other suitable sensing apparatus. Control system 57 is configured to provide active control of the suspension system in order to induce relative motion of the vehicle in relation to the suspension. Control system 57 will vary the tilt angle and speed of driver 55 according to external conditions, such as: occupancy of the vehicle, load carried, vehicle speed, and the slope of the ground, to name a few.

In the preferred embodiment, suspension system 27 allows free movement of uprights 39 until a selected tilt angle A is reached. When the selected tilt angle A is reached, such as during a turn, control system 57 is activated by sensor 59. Control system 57 then actuates driver 55, thereby causing movement of connecting rod 53 and corresponding rotational movement of rotating rocker arms 51 about pivot pins 58. The rotational movement of rotating rocker arms 51 causes frame 19 to tilt in the direction of the turn, thereby improving the handling of trike 11. It will be appreciated that a full lean is not necessary. One purpose of suspension system 27 is to "break" the steering so that front fork and suspension system 25 "falls" into the turn more easily.

Figure 4:
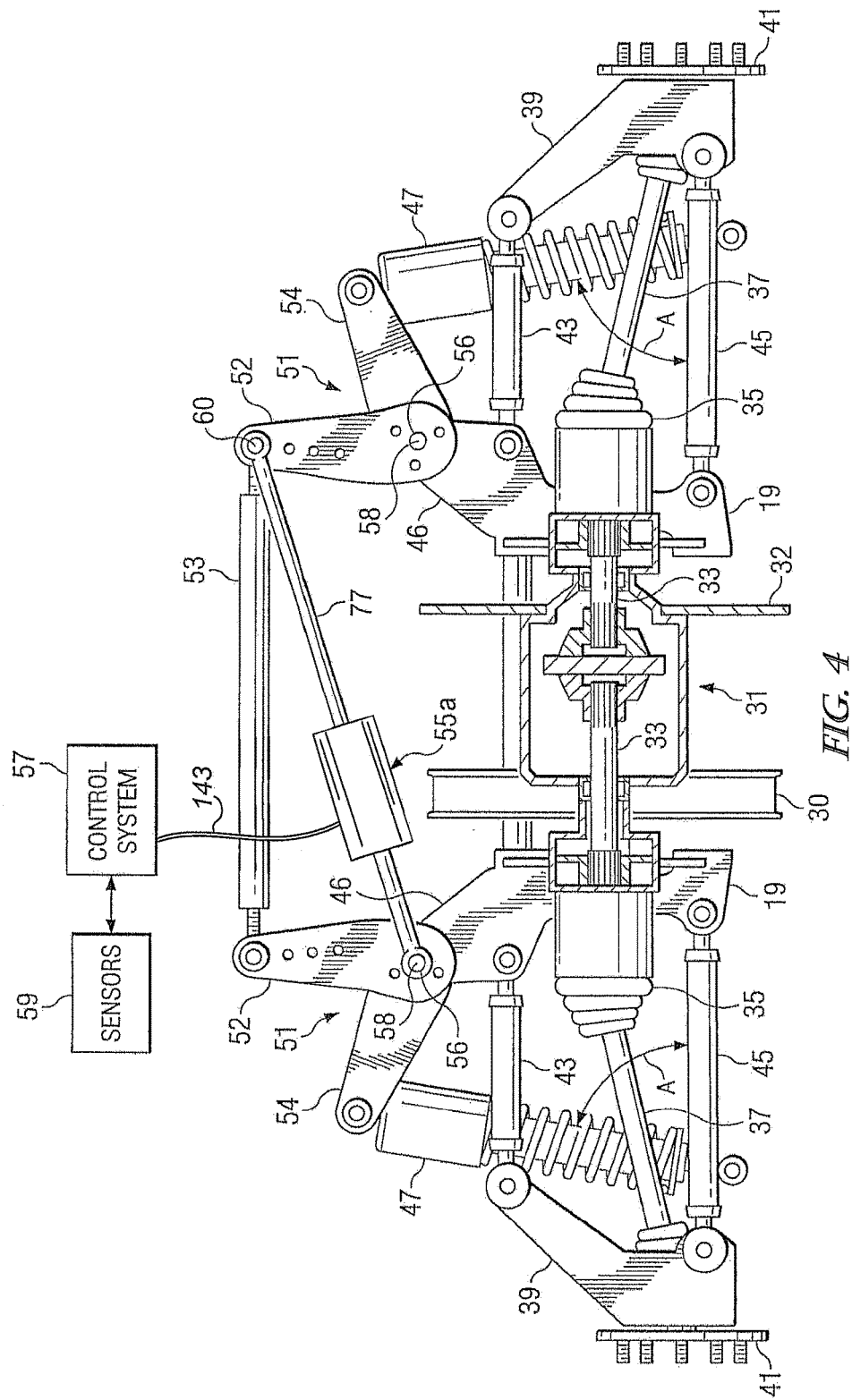
FIG. 4 is a schematic of an alternative embodiment of a tilting independent suspension system for a motorcycle trike according to the present application.
Figure 5:
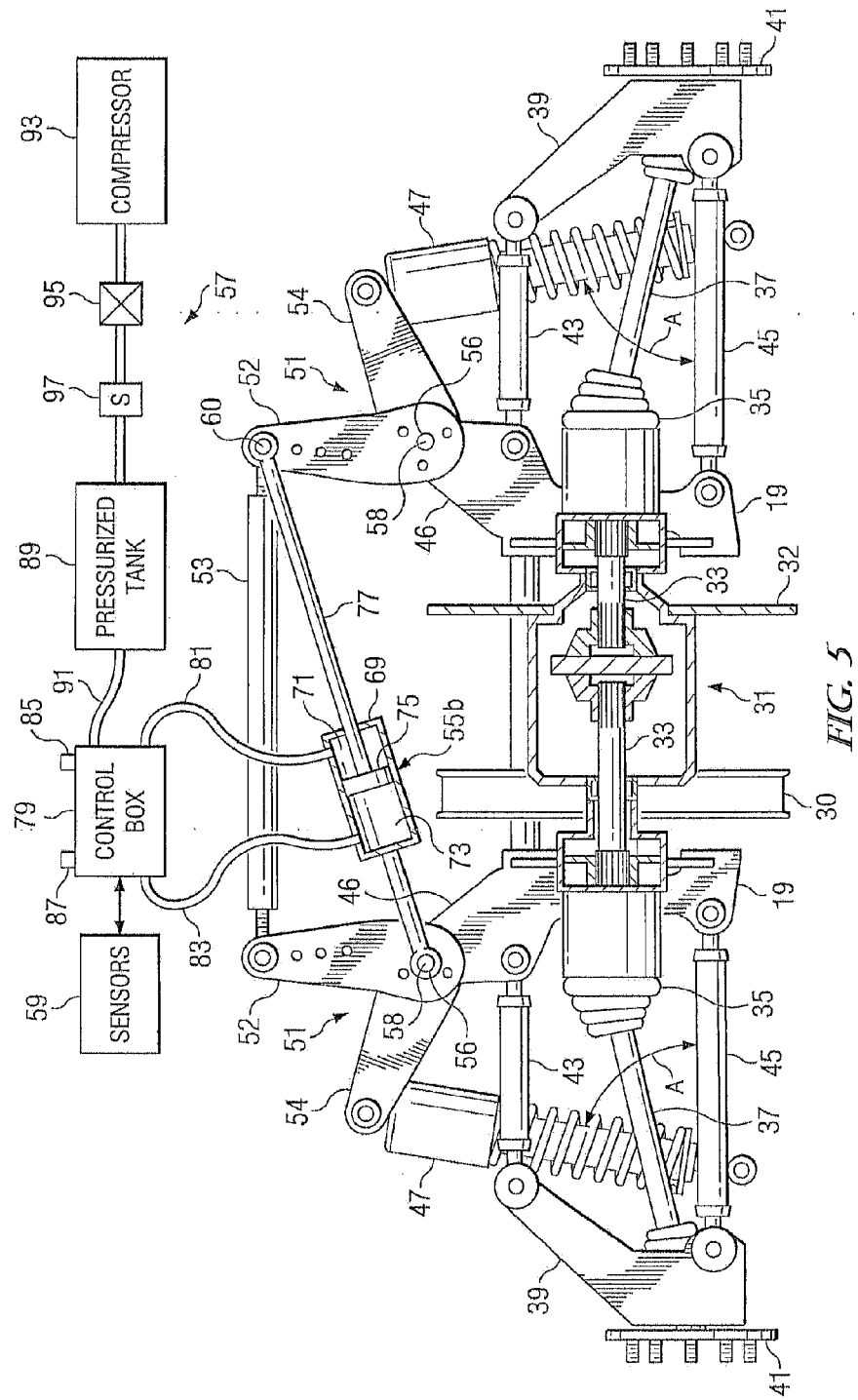
FIG. 5 is a schematic of an alternative embodiment of a tilting independent suspension system for a motorcycle trike according to the present application.

As seen in particular with FIG. 3, driver 55 may be configured to couple directly to a portion of control system 57 and connecting rod 53 to provide a direct mechanical control of driver 55. It is understood that driver 55 may be located and oriented differently within suspension system 27 in order to provide rotational movement of rotating rocker arms 51. FIGS. 4 and 5 illustrate another embodiment of control system 57 configured to operate suspension system 27 wherein one end of control driver 55 is pivotally mounted to tower 46 at pivot pin 58, and the other end of control driver 55 is pivotally mounted to rocker arm 51 at a second pivot pin 60.

As stated previously, driver 55 may be an electric device. FIG. 4 illustrates an electric actuator 55a in electrical communication with control system 57. Actuator 55a is similar in form and function to that described in FIGS. 2 and 3 however actuator 55a of FIG. 5 is electrically driven. Control actuator 55a is pivotally mounted to tower 46 at pivot pin 58, and the other end of control actuator 55a is pivotally mounted to rocker arm 51 at a second pivot pin 60. Actuator 55a is coupled to an elongated shaft 77. Shaft 77 is configured to extend or retract to move rocker arms 51. Control system 57 is activated by one or more sensors 59 operably associated with suspension system 27, whereby a signal is sent from control system 57 to actuator 55a to extend or retract shaft 77. Control system 57 uses wired and/or wireless electrical communications in order to induce movement of shaft 77 and suspension system 27.

In operation, when trike 11 is traveling straight, control actuator 55a is in a trim condition in which trike 11 is in a vertically disposed position. When trike 11 goes into a turn, sensors 59 send a signal to control system 57. Control system 57 then selectively extends or retracts actuator 55a. Because actuator 55a is pivotally mounted to tower 46, movement of actuator 55a causes a corresponding rotation of rocker arms 51. The rotational movement of rotating rocker arms 51 causes frame 19 to tilt in the direction of the turn, thereby improving the handling of trike 11. Control system 57 will maintain trike 11 in the tilted mode as long as sensors 59 sense that trike 11 is in the turn. As trike 11 leaves the turn and returns to straight travel, control system 57 returns control actuator 55a to the trim condition.

FIG. 5 illustrates the use of a hydraulic actuator 55b in communication with control system 57. Actuator 55b is similar in form and function to that described in FIGS. 2 and 3; however, actuator 55b of FIG. 5 is hydraulically driven. Control actuator 55b is pivotally mounted to tower 46 at pivot pin 58, and the other end of control actuator 55b is pivotally mounted to rocker arm 51 at a second pivot pin 60. Control actuator 55b includes a housing 69 that defines two opposing fluid chambers 71 and 73 that are separated by a piston 75. Piston 75 is connected to an elongated shaft 77. Housing 69 is pivotally connected to pivot pin 58, and elongated shaft 77 is pivotally connected to pivot pin 60. Fluid chambers 71 and 73 are in fluid communication with a control box 79 via conduits 81 and 83. Though shown in the figure as a pneumatic or hydraulic type driver 55, it is understood that control system 57 may use any other appropriate type of driver as described above.

Control box 79 includes vent ports 85 and 87 that are operably associated with fluid chambers 71 and 73, respectively. It will be appreciated that in applications in which the control fluid is air, vent ports 85 and 87 may be open to the environment; and that in applications in which the control fluid is a hydraulic fluid, vent ports 85 and 87 would be in fluid communication with a fluid reservoir. Control box 79 is in fluid communication with a source of pressurized fluid, such as pressurized tank 89, via a conduit 91. Pressurized tank 89 supplies pressurized fluid to control box 79 for controlling control actuator 55*b*. It is preferred that the fluid in control system 57 be air, and that tank 89 be maintained at about 80 psi. However, it should be understood that a wide variety of control fluids may be used over a wide range of pressures, depending upon the desired application, responsiveness, and cost.

Tank 89 is in fluid communication with and pressurized by a compressor 93. A one-way check valve 95 and a pressure switch 97 may be disposed between compressor 95 and tank 89. One-way check valve 95 ensures that the fluid does not pass back through to compressor when compressor is in the off mode. Pressure switch 97 turns off compressor 95 when tank 89 has reached the desired pressure, and prevents compressor 95 from over-pressurizing control system 57.

In operation, when trike 11 is traveling straight, control actuator 55*b* is in a trim condition in which the pressures in chambers 71 and 73 are equalized. When trike 11 goes into a turn, sensors 59 send a signal to control box 79. Control box 79 then selectively increases the pressure in one of chambers 73 or 75, and correspondingly decreases the pressure in the other chamber. Vent ports 85 and 87 allow the fluid from the depressurized chamber to be appropriately vented. As a result, piston 75 moves in one direction or the other. Because housing 69 is pivotally mounted to tower 46, movement of piston 75 causes a corresponding rotation of rocker arms 51. The rotational movement of rotating rocker arms 51 causes frame 19 to tilt in the direction of the turn, thereby improving the handling of trike 11. Control system 57 will maintain trike 11 in the tilted mode as long as sensors 59 sense that trike 11 is in the turn. As trike 11 leaves the turn and returns to straight travel, control box 79 causes the pressure in chambers 71 and 73 to again equalize and return control actuator 55*b* to the trim condition.

Figure 6:
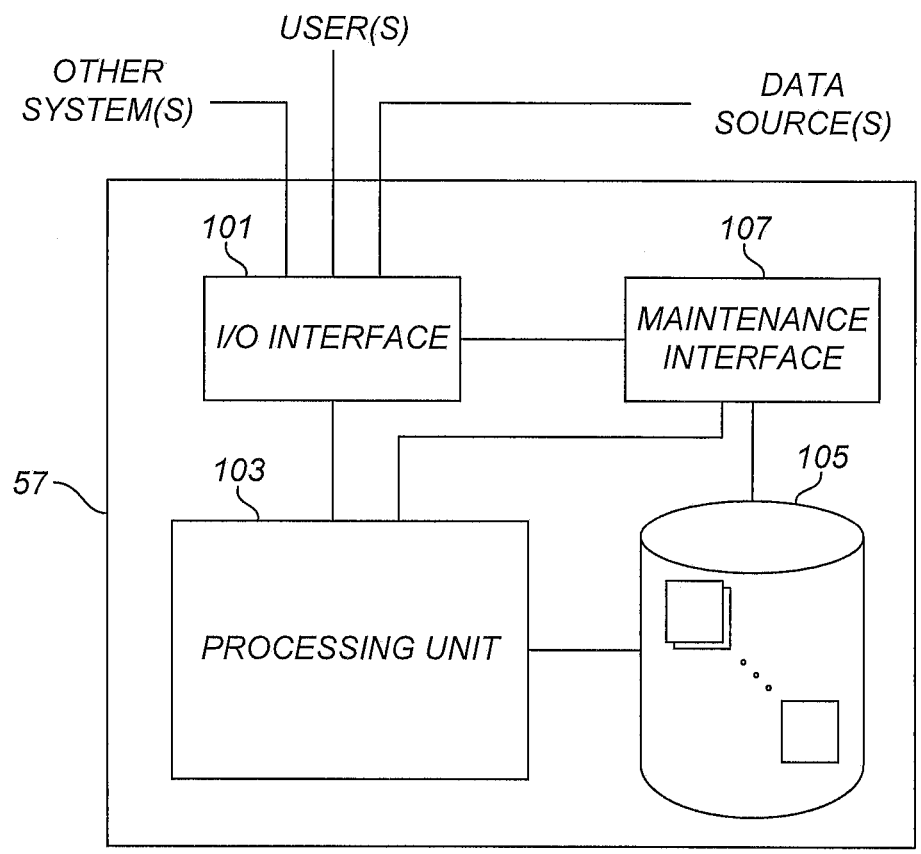
FIG. 6 is an exemplary schematic of a control system used in the motorcycle trike of the present application.

Referring now also to FIG. 6 in the drawings, an exemplary control system 57 for operating suspension system 27 between the tilting mode and the non-tilting mode is illustrated. Control system 57 is an electrically controlled computerized device configured to operably rotate trike 11 from side to side about the centerline of trike 11. This rotation occurs as suspension system 27 is adjusted through rotating rocker arms 51. Control system 57 is configured to receive and process input data from a plurality of sensors 59 relating to forces acting upon trike 11, angular momentum, the relative angle of trike 11 relative to the ground, and others for example. Once processed, control system 57 sends out command data to driver 55 to tilt trike 11. It is understood that reference to driver 55 refers equally to actuators 55*a*, 55*b*.

The control system 57 includes an input/output (I/O) interface 101, a processing unit 103, a database 105, and a maintenance interface 107. Alternative embodiments can combine or distribute the input/output (I/O) interface 101, processing unit 103, database 105, and maintenance interface 107, as desired. Embodiments of the control system 57 can include one or more computers that include one or more processors and memories configured for performing tasks described herein the application. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks. Furthermore the computers may use transitory and non-transitory forms of computer-readable media. Non-transitory computer-readable media is to be interpreted to comprise all computer-readable media, with the sole exception of being a transitory, propagating signal.

The I/O interface 101 provides a communication link between external users, systems, and data sources and components of the control system 57. The I/O interface 101 can be configured for allowing one or more users to input information to the control system 57 via any known input device. Examples can include a keyboard, mouse, touch screen, microphone, and/or any other desired input device. The I/O interface 101 can be configured for allowing one or more users to receive information output from the control system 57 via any known output device. Examples can include a display monitor, a printer, a speaker, and/or any other desired output device. The I/O interface 101 can be configured for allowing other systems to communicate with the control system 57. For example, the I/O interface 101 can allow one or more remote computer(s) to access information, input information, and/or remotely instruct the control system 57 to perform one or more of the tasks described herein. The I/O interface 101 can be configured for allowing communication with one or more remote data sources. For example, the I/O interface 101 can allow one or more remote data source(s) to access information, input information, and/or remotely instruct the control system 57 to perform one or more of the tasks described herein.

The database 105 provides persistent data storage for control system 57. While the term "database" is primarily used, a memory or other suitable data storage arrangement may provide the functionality of the database 105. In alternative embodiments, the database 105 can be integral to or separate from the control system 57 and can operate on one or more computers. The database 105 preferably provides non-volatile data storage for any information suitable to support the operation of the control system 57, including various types of data discussed in connection within this application.

The maintenance interface 107 is configured to allow users to maintain desired operation of the control system 57. In some embodiments, the maintenance interface 107 can be configured to allow for reviewing and/or revising the data stored in the database 105 and/or performing any suitable administrative tasks commonly associated with database management. This can include, for example, updating database management software, revising security settings, and/or performing data backup operations. In some embodiments, the maintenance interface 107 can be configured to allow for maintenance of the processing unit 103 and/or the I/O interface 101. This can include, for example, software updates and/or administrative tasks such as security management and/or adjustment of certain tolerance settings.

The processing unit 103 is configured for processing input data received through the I/O interface 101. The processing unit 103 can include various combinations of one or more processors, memories, and software components. The processing unit 103 processes the input data using mathematical calculation to integrate the input data and control the motor of the driver 55. For example, processing unit 103 can be configured to determine the relative angle of the trike with respect to the ground. Furthermore, processing unit 103 can be configured to determine the angular momentum of trike 11 and relative forces, such as gravitational forces, acting upon trike 11. Using such data, processing unit 103 is configured to tilt suspension system 27 according to the speed and position of trike 11. Processing unit 103 is configured to perform the functions and processes described within this application.

Figure 7:
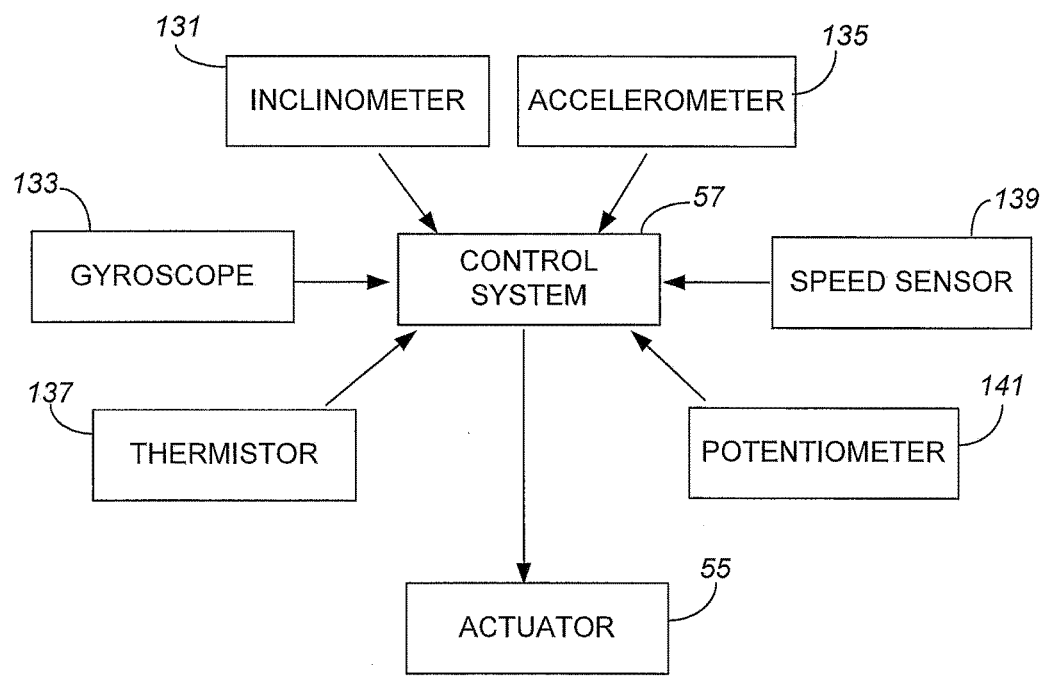
FIG. 7 is a schematic of the sensors used with the control system of FIG. 6 to operate the tilting independent suspension system of the present application

Referring now also to FIG. 7 in the drawings, a schematic of the sensors used with control system 57 is illustrated. Control system 57 receives input data from one or more sensors 59. Examples of such sensors are: a motion control sensor, a speed sensor 139, a thermistor 137, and a potentiometer 141, to name a few. A motion control sensor can include an inclinometer 131, an accelerometer 135 and a gyroscope 133. It is understood that although inclinometer 131, accelerometer 135, and gyroscope, 133 are described as separate distinct sensors, such motion control sensors are processed as a function of control system 57. Additionally, motion control sensors are typically internal to control system 57.

Inclinometer 131 is configured to measure the angle of trike 11 relative to the earth. Control system 57 is permitted to tilt trike 11 in order to navigate turns. In doing so, control system 57 is limited to a tilt range. The tilt range extends from a max tilt angle to the center/vertical position. Trike 11 has a tilt range for tilting in each direction. Control system 57 is configured to remain within the tilt range so as to prevent over tilting. Inclinometer 131 is able to detect when trike 11 is traveling on a banked or sloped road and account for that angle in determining the acceptable tilt range. For example, assume control system 57 permits a max tilt angle of ten degrees. If the road is tilted at two degrees downward to the right prior to a turn, control system 57 automatically adjusts the max tilt angle for tilting in each direction to compensate for the biased slope in the road. Use of inclinometer 131 requires control system 57 to be oriented near the centerline of trike 11 and have a relatively level orientation. Other orientations and locations are possible as long as necessary calibration and design is performed.

Gyroscope 133 measures the angular momentum of trike 11 to detect changes in direction of trike 11. Accelerometer 135 is used to detect the amount of gravitational pull against trike 11 to detect turning. Control system 57 is configured to use one or both of gyroscope 133 and/or accelerometer 135. In the preferred embodiment, control system 57 uses both gyroscope 133 and accelerometer 135. In such an embodiment, accelerometer 135 is primarily a fail-safe or back-up to gyroscope 133. Control system 57 continuously compares the readings and input data from gyroscope 133 and accelerometer 135. Control system 57 is configured to return trike 11 back to center (vertical position) and shut down if discrepancies exist between sensors 133 and 135. The amount of discrepancy permitted by control system 57 may be selected by the user.

Speed sensor 139 is configured to provide input data to control system 57 concerning the speed of trike 11. It is understood that control system 57 and suspension system 27 are configured in a way so as to be a retrofit on existing motorcycles or trikes 11. As such, the preferred embodiment uses a separate speed sensor as opposed to existing speedometers for simplicity of integrating the systems. However, it is understood that control system 57 may receive input data from any existing systems on trike 11. Speed sensor 139 can be located in a plurality of locations on trike 11. It is understood that multiple ways exist to detect the speed of trike 11. One such method is where speed sensor 139 is positioned next to a rotating member of trike 11, such as a brake rotor, and uses a magnetic center member to detect the rotation of the rotating member. Speed sensor 139 may function using optical features as opposed to magnetic features in other embodiments.

Potentiometer 141 is configured to provide input data to control system 57 concerning the position of driver 55. In general, potentiometer 141 provides positional feedback to control system 57. Potentiometer 141 may be located in a plurality of locations on trike 11. In the preferred embodiment potentiometer 141 is coupled to second pivot pin 60. Potentiometer 141 is in electrical communication with driver 55 so as to determine the location of driver 55. In other embodiments, a servo may be used in place of driver 55. In such an embodiment, the servo may be used to replace driver 55 and potentiometer 141 within control system 57.

Thermistor 137 measures temperature variations in processing unit 103. Thermistor 137 typically includes a variable resistor which can be affected by temperature fluctuations. Performance of control system 57 can be affected by ambient temperature variations that are not accounted for within processing unit 103.

In operation, processing unit 103 receives input data from inclinometer 131 to determine the angle of trike 11. Processing unit 103 subtracts out that angle from the max tilt angle so as to prevent over tilting. Processing unit 103 uses tabular data stored in database 105 and mathematically processes selected information to isolate the appropriate tilt angle of trike 11 based upon speed of trike 11 and relative angle from inclinometer 131. Based upon the speed, as registered from speed sensor 139, and angle of trike 11, processing unit 103 sends out command data to operate driver 55. Command data is transmitted via wires 143 to driver 55 and/or other sensors 59. As stated earlier, it is understood that some embodiments may use wireless communications between any of control system 57, sensors 59, and/or driver 55.

It will be appreciated that control system 57 is preferably programmed or adjusted to provide a safe and smooth transition between tilting and straightening out. Control system 57 automatically adjusts the speed at which driver 55 moves the suspension of trike 11 into and out of tilt to provide the safe and smooth transition. The speed of driver 55 depends upon the speed of trike 11 and the tilt angle. Control system 57 may vary the speed of driver 55 in a plurality of ways. For example, control system 57 may use pulse width modulation or the introduction of step functions to regulate the speed at which trike 11 tilts.

It should be understood that control system 57 may be operated manually or may be automated by computers, microprocessors, or any of a wide variety of automated control devices as described above or as known in the art. For example, sensors 59 may be manual switches (not shown) disposed on the handlebars of trike 11 that are operated by the rider, or control system 57 may be configured to operate automatically without any input from the rider. In addition, it will be appreciated that trike 11 may include a means for manual or automatic override of control system 57.

Control system 57 is configured to accept input from users via I/O interface 101. This permits a user and/or manufacturer to connect external devices to control system 57 to modify or adjust performance characteristics and parameters of suspension system 27. Performance characteristics may relate to the speed at which driver 55 operates or the maximum tilt angle, to name a few. For example, control system 57 may be adjusted to regulate the speed at which driver 55 responds and moves. Control system 57 may permit a more aggressive ride, wherein driver 55 is directed to move at relatively faster speeds. Likewise, control system 57 may be adjusted to permit a softer ride, wherein driver 55 is directed to move at relatively slower speeds. The adjustments are made by the manufacturer upon the request of the user. In an alternative embodiment, control system 57 may be configured to permit user customization wherein a rider manually selects the associated performance characteristics and parameters without manufacturer assistance.

Figure 8:
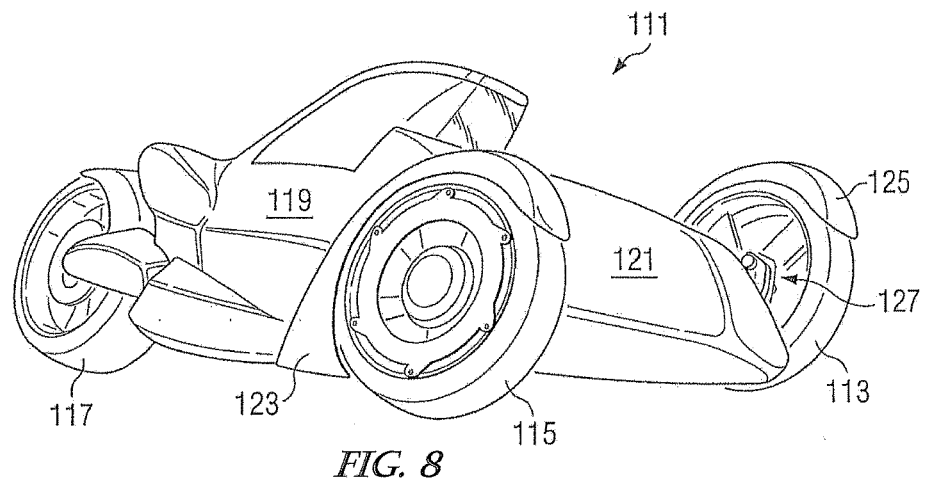
FIG. 8 is a perspective view of a motorcycle trike having a tilting independent suspension system according to the present application in which the trike has two front wheels and one rear wheel.

Referring now to FIG. 8 in the drawings, an alternate embodiment of the present application is illustrated. In this embodiment, a trike 111 has two front wheels 113, 115 and one rear wheel 117. In this embodiment, a suspension system 127, which is similar in form and function to suspension system 27, is operably associated with the front wheels instead of the rear wheels. Suspension system 127 allows front wheels 113, 115 to tilt when trike 111 turns, making trike 111 easier to handle. Furthermore, trike 111 may include the use of control system 57 for use with the front wheels 113, 115.

As is shown, trike 111 may include a body portion 119 that covers or encloses all or part of suspension system 127. In those embodiments in which body portion 119 includes a main body 121 and separate fenders 123, 125, it will be understood that suspension system 127 may be appropriately scaled down in size and shape, or relocated on trike 111 to fit within the confines of main body 121 and/or fenders 123,125. For example, the rotating rocker arms, the adjustable connecting rod, the driver, and the other components of suspension system 127 may be located beneath or in the same plane as the differential. One benefit of the present application is that the components can be located in a wide variety of locations on the trike without adversely affecting the operation of the suspension system.

Figure 9:
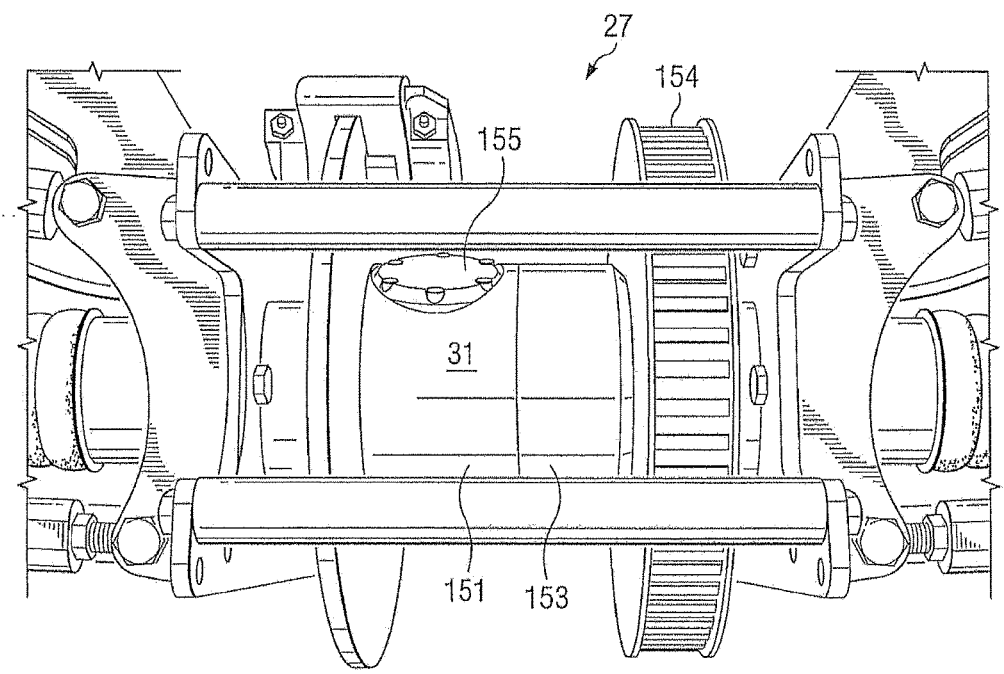
FIG. 9 is a perspective view of a differential according to the present application for the tilting independent suspension system of the application.
Figure 10:
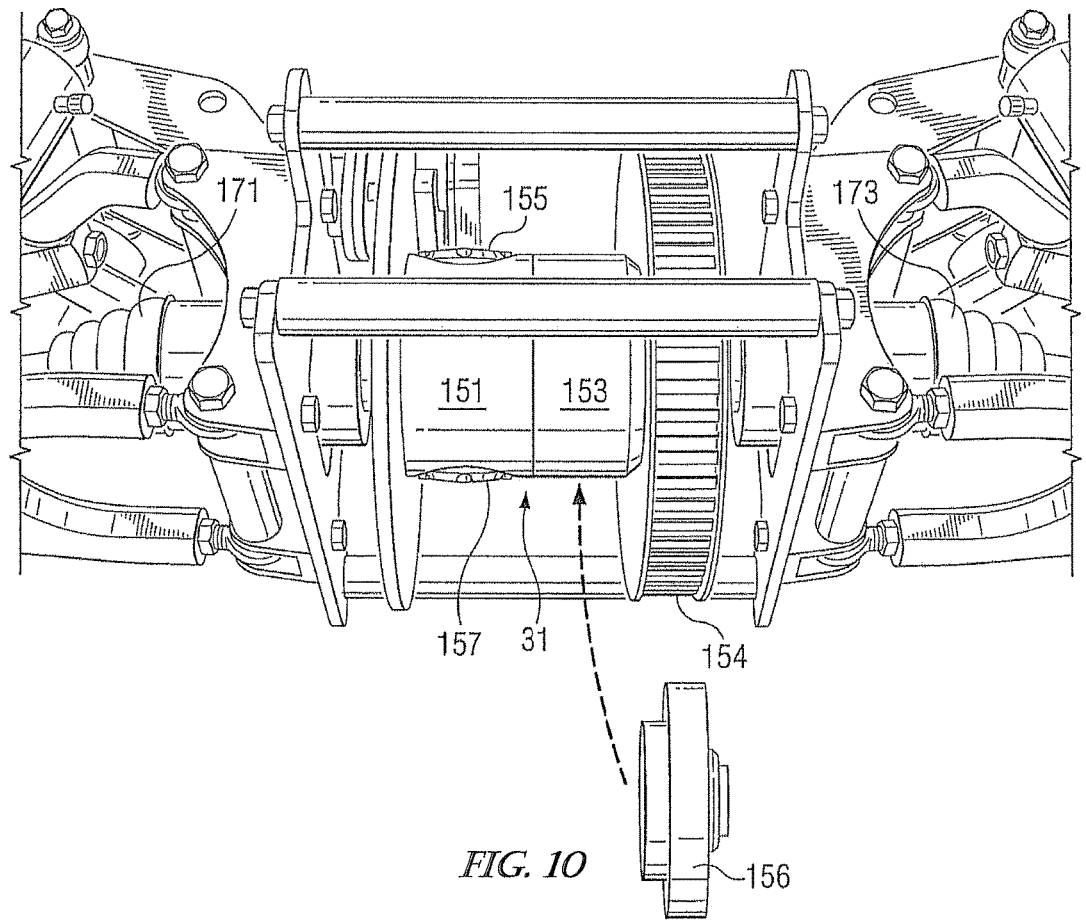
FIG. 10 is another perspective view of the differential of FIG. 6 showing an alternate reduced size cover plate.
Figure 11:
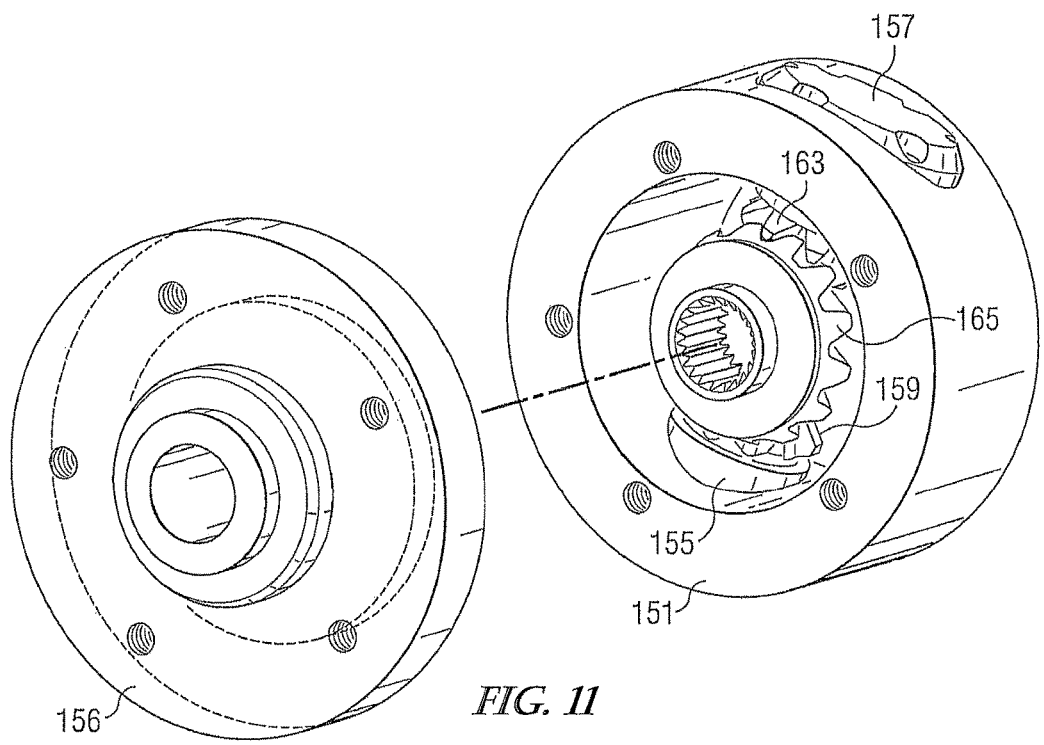
FIG. 11 is a perspective view of the differential of FIG. 6 shown with the cover plate removed.
Figure 12:
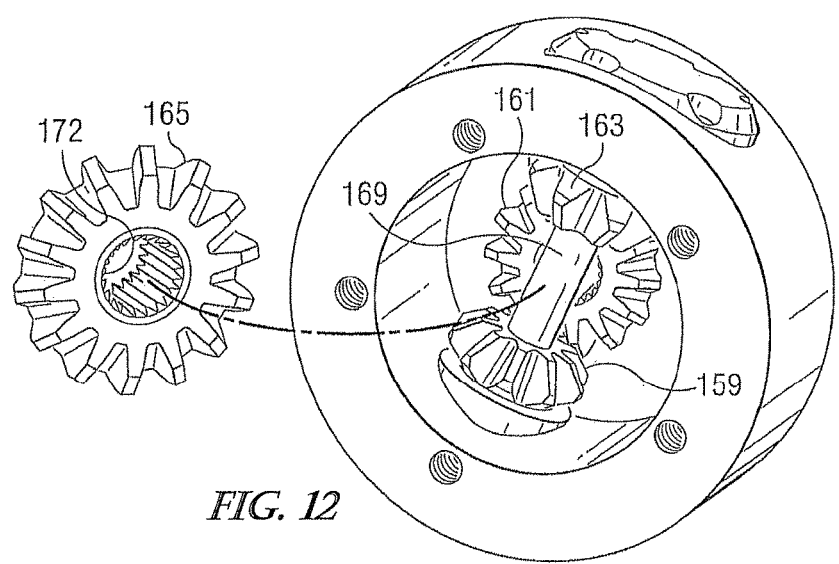
FIG. 12 is a perspective view of the differential of FIG. 6 shown with the cover plate and one of the bevel gears removed.
Figure 13:
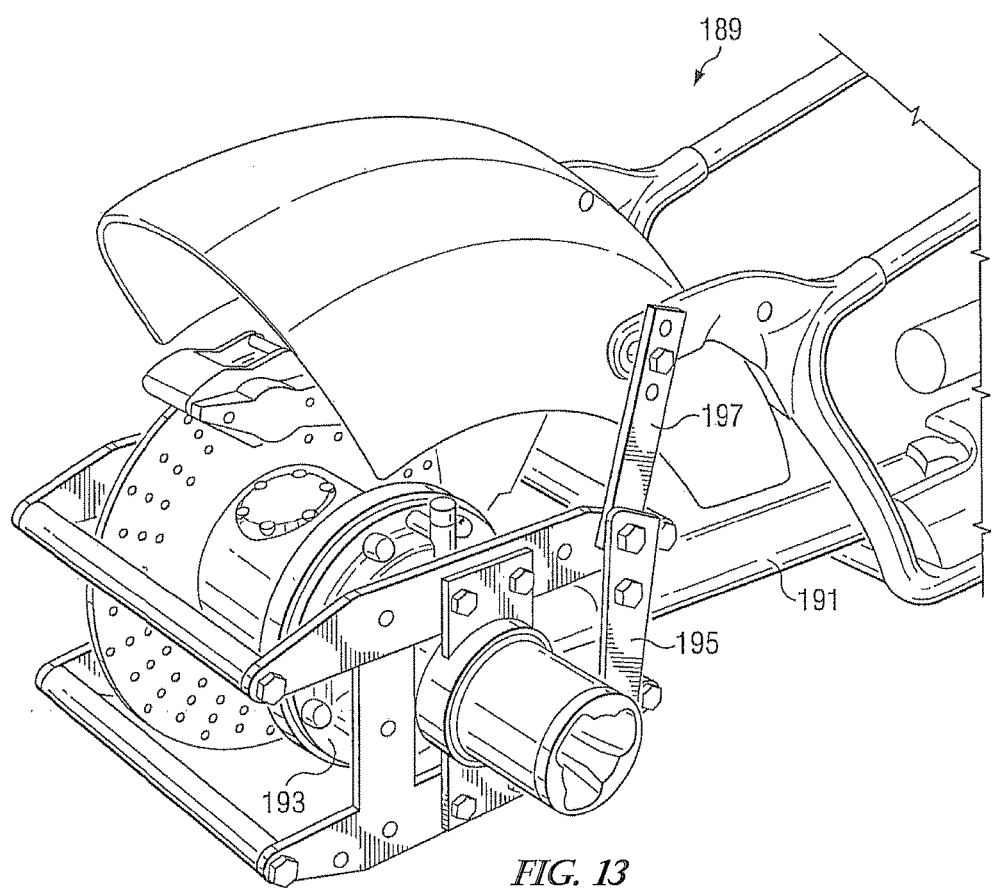
FIG. 13 is a perspective view of the differential of FIG. 6 shown installed on a motorcycle having a shaft-drive transmission.
Figure 14A:
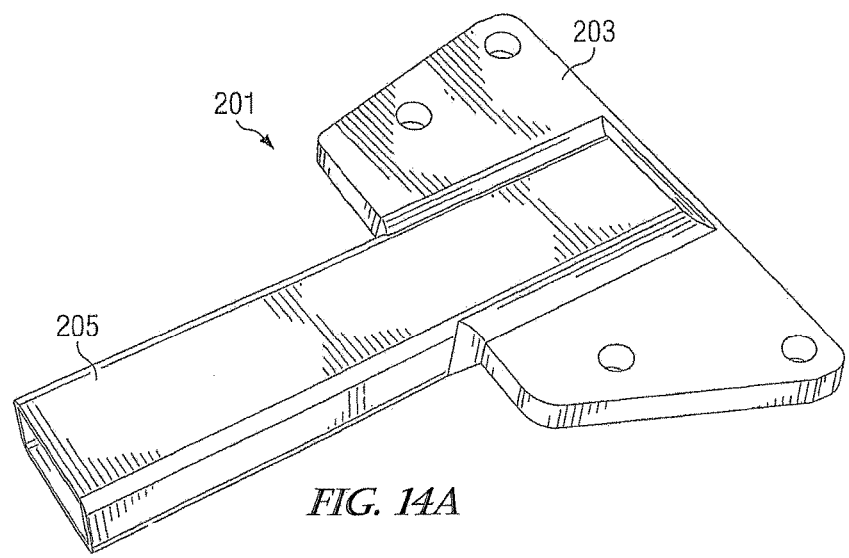
FIGS. 14A-17F are various views of several different adapter brackets used with the present application.
Figures 14B, 14C:
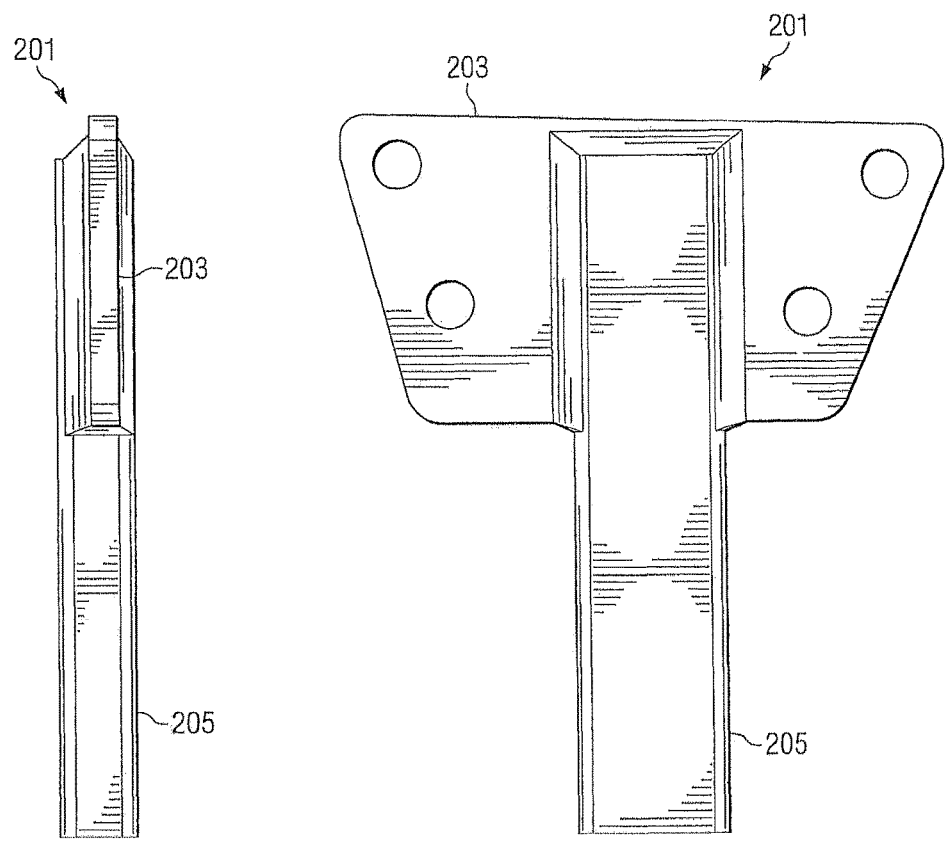
Figure 14D:
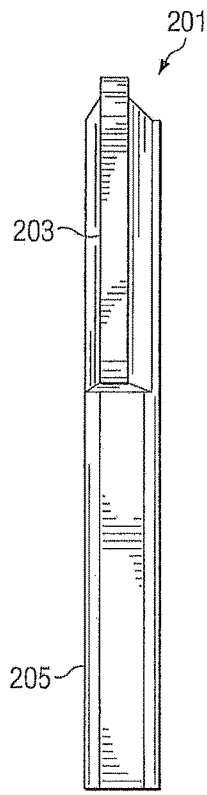
Figure 14E:
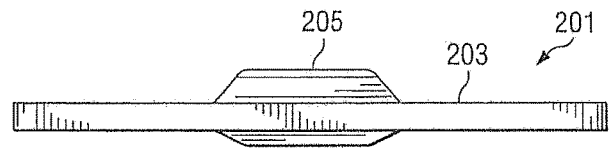
Figure 14F:
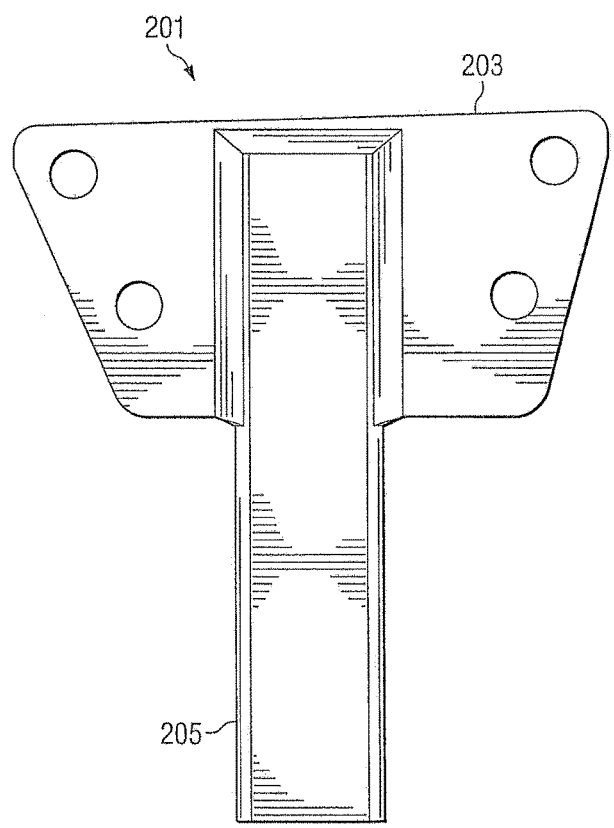
Figure 14G:
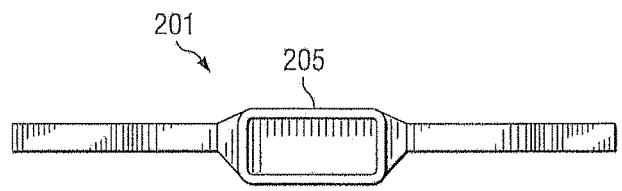
Figure 15A:
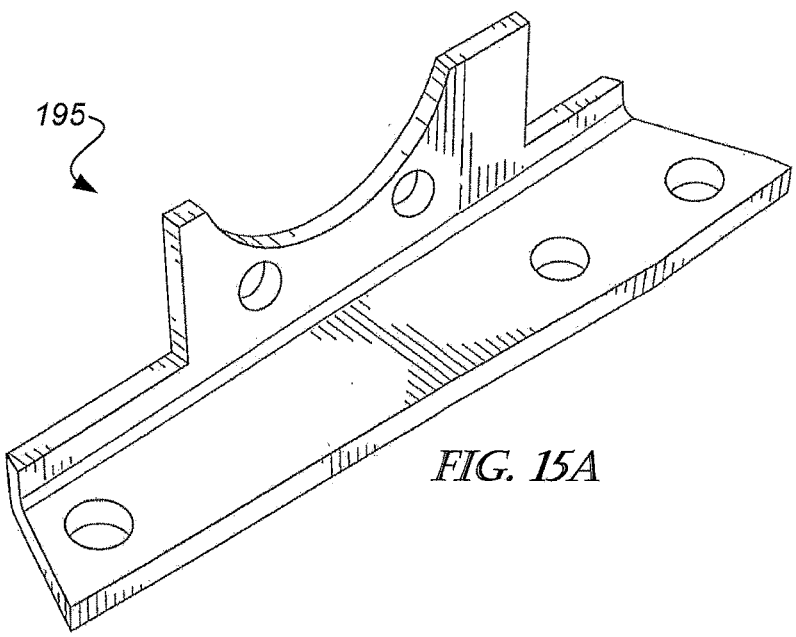
Figure 15B:
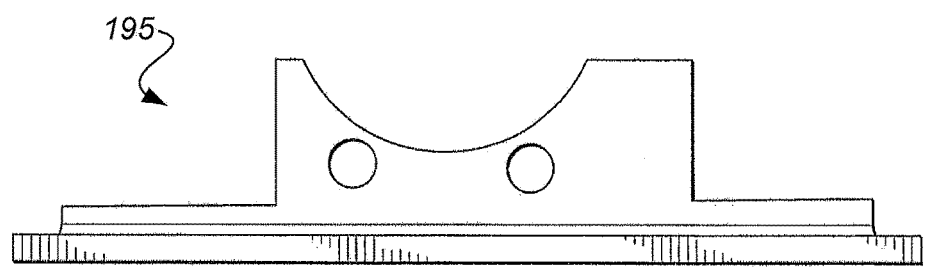
Figure 15C:
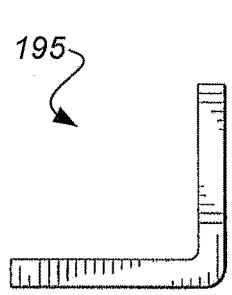
Figure 15D:
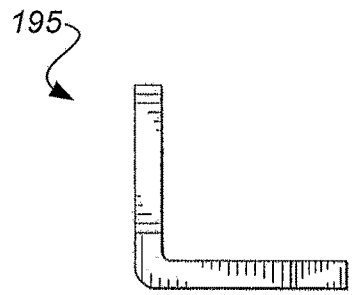
Figure 15E:
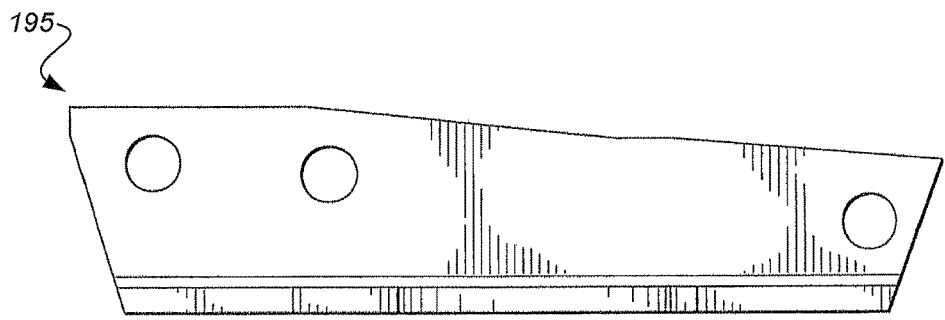
Figure 15F:
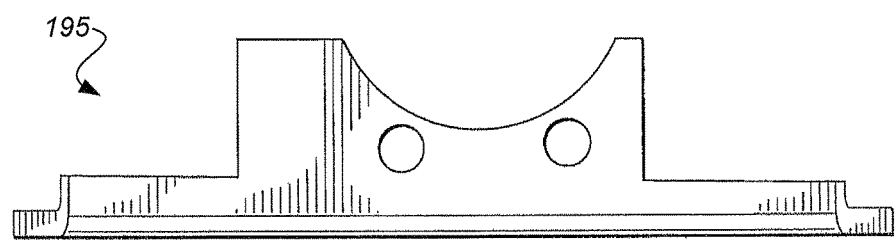
Figure 15G:
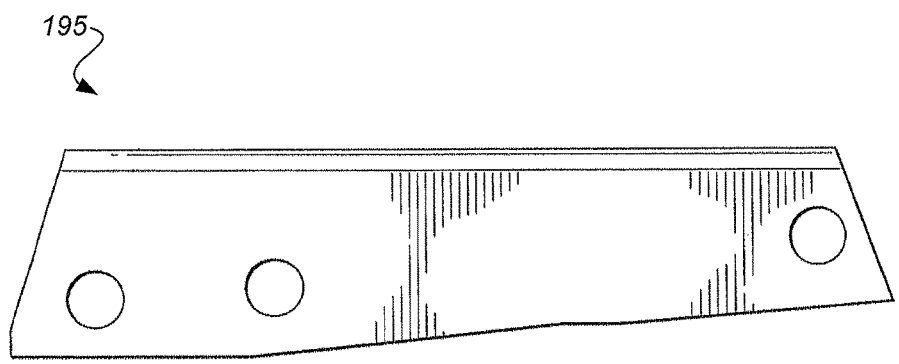
Figure 16A:
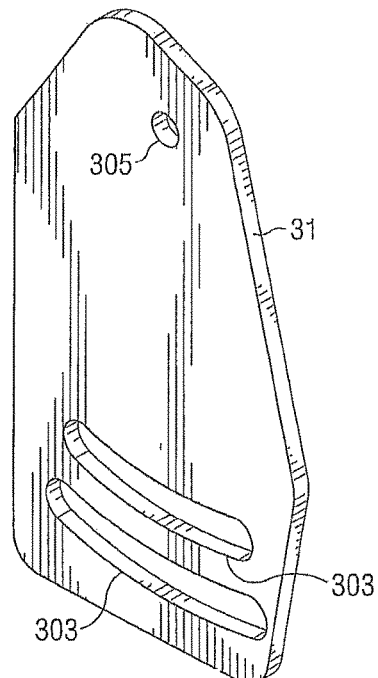
Figure 16B:
Figure 16C:
Figures 16D, 16E, 16F:
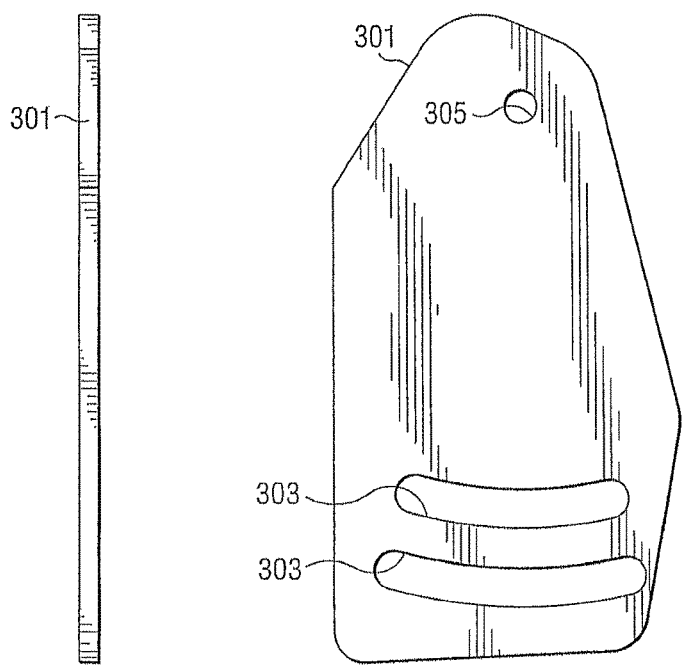
Figure 17A:
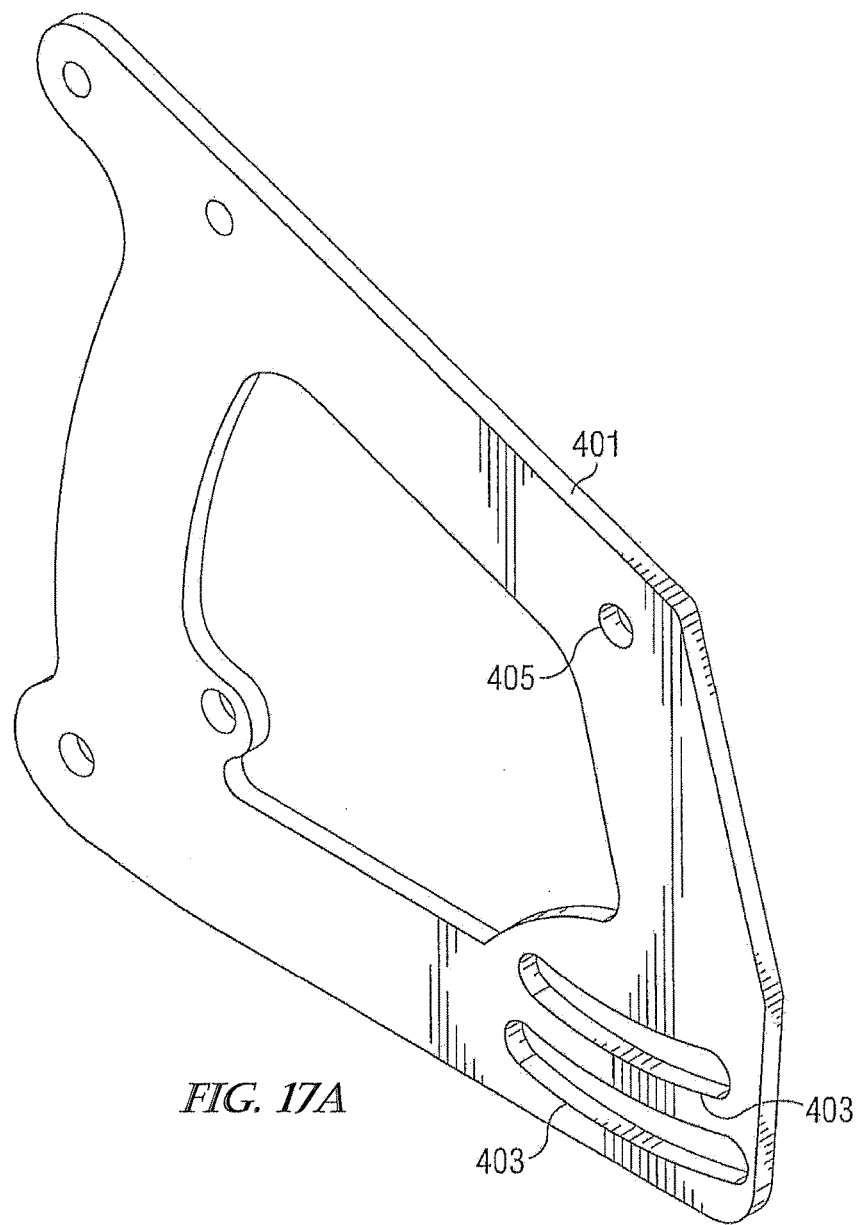

Referring now to FIGS. 9-13 in the drawings, differential 31 is shown in various views. In FIG. 9, differential 31 is shown installed in suspension system 27. Differential 31 is fixed to and rotates with a drive pulley 154 for transmitting torque to the wheels of the trike. Differential 31 includes a base portion 151 and a cap portion 153 that encloses differential 31. Base portion 151 includes two inserts 155, 157 that allow access to the interior of differential 31 for assembly and maintenance, and that provide internal operating surfaces for a pair of opposing bevel gears 159, 163. Cap portion 153 also functions as a spacing means that allows differential 31 to be used to convert both shaft-drive and belt-drive motorcycles to trikes. In FIGS. 9 and 10, differential 31 is shown installed on a belt-drive trike. In FIG. 13, cap portion 153 of differential 31 has been replaced with an alternate, reduced size cap portion 156. Cap portion 156 allows differential 31 to be used installed on a shaft-drive trike. Cap portions 153 and 156 are shown side-by-side in FIG. 10 for comparative purposes.

Differential 31 includes a plurality of internal bevel gears 159, 161, 163, 165 that allow the two wheels of the trike, whether located on the front or on the rear, to rotate at different speeds as the trike travels through turns. Gears 159 and 163 oppose each other and rotate on concave support surfaces located on the interior surfaces of inserts 155, 157. Gears 159 and 163 are supported by a fixed shaft 169. Gears 161 and 165 oppose each other and are coupled together via gears 159 and 163. Gears 161 and 165 include internal splines 172 that are configured to matingly receive splined drive shafts (not shown) that extend outward from each side of differential 31 to continuously variable universal joints 171, 173. Gears 159, 161, 163, 165 rotate with base portion 151 and cap portion 153 and do no rotate relative to each other unless the trike is turning.

In FIG. 13, differential 31 is installed on a trike 189 having a shaft-drive transmission. Torque is transmitted to differential 31 from a drive shaft 191 through a 90° coupling member 193. Thinner cap portion 156 is best suited for this embodiment, due to the thickness of coupling member 193. In this embodiment, the splined shaft on the side of coupling member 193 is longer so that it can pass through coupling member 193 to the continuously variable universal joint on that side. In these shaft-drive embodiments, the suspension system is mounted to the motorcycle with an adapter bracket 195, a mounting link 197, and a second hatchet-shaped adapter bracket (see FIGS. 14A-14G).

Referring now to FIGS. 14A-15G in the drawings, several different adapter brackets that are used to mount the suspension system to the motorcycle frame are illustrated. The adapter brackets shown in FIGS. 14A-15G are typically used to convert shaft-drive motorcycles to trikes. In FIGS. 14A-14G, an adapter bracket 201 for converting a shaft-drive motorcycle to a trike is shown. Adapter bracket 201 includes a coupling end 203 and a shaft end 205 that is configured to be coupled to and/or telescopically mate with the frame of the motorcycle. Adapter bracket 195 is shown in FIGS. 15A-15G.

The adapter brackets shown in FIGS. 16A-17F are typically used to convert belt-drive motorcycles to trikes. Adapter bracket 301 shown in FIGS. 16A-16F includes one or more arcuate slots 303 that allow the suspension system to rotate about a pivot point 305. This allows the belt to be placed over the belt drive pulley and adjusted. Likewise, adapter bracket 401 shown in FIGS. 17A-17F includes one or more arcuate slots 403 that allow the suspension system to rotate about a pivot point 405. The dashed lines indicate that the shape of that portion of bracket 401 may vary.

In another embodiment of the present application, the belt drive pulley includes a central, hollowed-out can-shaped portion. This can shaped portion allows the differential and bearings to be completely or partially recessed therein. This configuration allows longer drive shafts to be used, which in turn, allows the suspension system to have a greater range of tilting angles.

Figure 18:
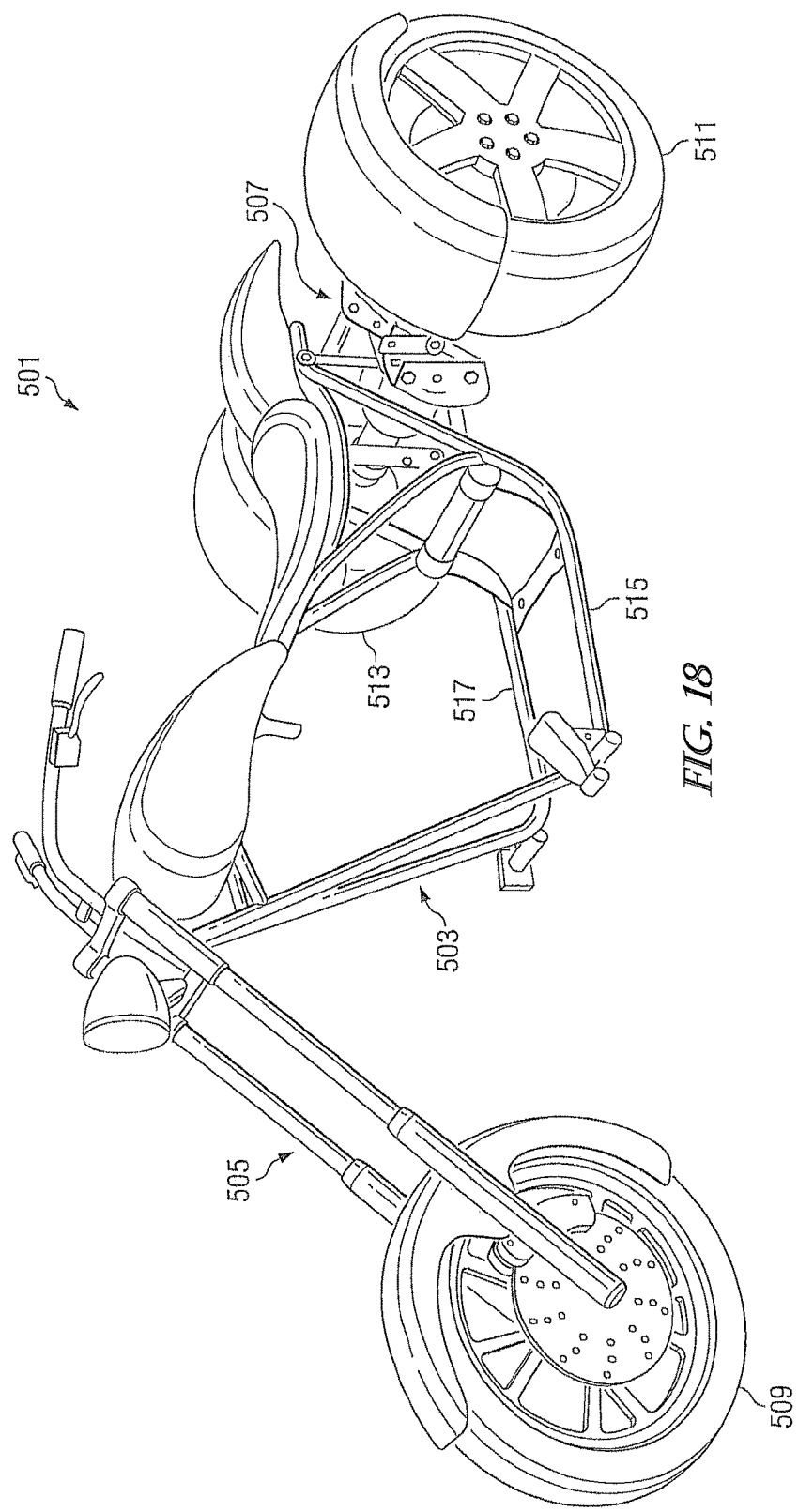
FIG. 18 is a perspective view of a rolling chassis for a motorcycle trike and according to the application.

The suspension system of the present application is particularly well suited for use in a universal rolling chassis according to the present application. Such a universal rolling chassis allows a user to install engines from a wide variety of manufacturers with little or no modification to the rolling chassis or suspension system. FIG. 18 shows a rolling chassis 501 having a frame 503, front suspension 505, and rear tilting suspension 507. A front wheel 509 is attached to front suspension 505, and rear wheels 511, 513 are attached to rear suspension 507. Frame rails 515, 517 support an engine installed within frame 503.

It is apparent that an application with significant advantages has been described and illustrated. Although the present application is shown in a limited number of forms, it is not limited to just these forms, but is amenable to various changes and modifications without departing from the spirit thereof. For example, the application is described as being used in motorcycles, but it should be understood that the tilting suspension system may also be used for other types of vehicles.

We claim:

1. A method of improving the handling of a vehicle having a vehicle suspension system, the method comprising:

measuring a measured tilt angle of the vehicle;

receiving input data from a sensor related to at least one of speed and orientation of the vehicle;

processing the input data within a control system;

transmitting command data from the control system configured to actively change the orientation of the vehicle suspension system; and activating the control system to actively change the orientation of the vehicle suspension system once the measured tilt angle is greater than a selected tilt angle.

2. The method of claim 1, further comprising:

adjusting a performance characteristic of the control system.

3. The method of claim 1, further comprising:

turning off the control system.

4. The method of claim 1, wherein the vehicle tilts in relation to the ground as the orientation of the vehicle suspension system is changed.

5. The method of claim 1, wherein the control system determines a maximum tilt angle for the vehicle based upon the speed and orientation of the vehicle relative to the ground.

* * * * *